United States Patent [19]

Andros, Jr.

[11] Patent Number: 4,817,194
[45] Date of Patent: Mar. 28, 1989

[54] RADIO HAVING AN INVERTIBLE DISPLAY WITH REVERSIBLE CONTROLS

[75] Inventor: Richard P. Andros, Jr., Coral Springs, Fla.

[73] Assignee: Motorola, Inc., Schaumburg, Ill.

[21] Appl. No.: 91,152

[22] Filed: Aug. 28, 1987

[51] Int. Cl.⁴ ............................................. H04B 1/40
[52] U.S. Cl. .................................. 455/154; 455/158
[58] Field of Search ................................ 455/154, 158

[56] References Cited

U.S. PATENT DOCUMENTS

| | | | |
|---|---|---|---|
| 4,110,690 | 8/1978 | Kakigi | 455/158 X |
| 4,287,599 | 11/1981 | Goncharoff et al. | 455/158 X |
| 4,307,266 | 12/1981 | Messina | 379/97 x |
| 4,320,255 | 3/1982 | Null et al. | 455/158 X |

*Primary Examiner*—Thomas H. Tarcza
*Assistant Examiner*—Gilberto Barrón, Jr.
*Attorney, Agent, or Firm*—Martin J. McKinley

[57] ABSTRACT

A radio includes a frequency synthesizer that is under the control of a microcomputer. Stored in the microcomputer's memory is a menu of predetermined frequencies from which a particular frequency is selected by scrolling through the menu. Activating a first switch causes the microcomputer to scroll in one direction while activating a second switch causes the microcomputer to scroll in the opposite direction. A display, positioned on the top of the radio, displays a character set indicative of the particular frequency selected. When both switches are activated simultaneously, the orientation of the character set appearing in the display is inverted, and the scrolling direction of each switch reverses.

3 Claims, 4 Drawing Sheets

| MENU ENTRY | OPERATING FREQUENCY | DISPLAYABLE CHARACTER SET |
|---|---|---|
| 1 | 450.125 MHz | 05 |
| 2 | 450.225 MHz | 12 |
| 3 | 451.000 MHz | 23 |
| 4 | 451.500 MHz | 51 |
| 5 | 460.000 MHz | 74 |
| 6 | 457.000 MHz | 77 |
| 7 | 456.650 MHz | 84 |
| 8 | 451.650 MHz | 85 |
| 9 | 453.775 MHz | 91 |
| 10 | 452.550 MHz | 92 |
| • | | |
| • | | |
| • | | |
| • | | |
| 99 | | |

UP ↑
DOWN ↓

RADIO HAVING AN INVERTIBLE DISPLAY WITH REVERSIBLE CONTROLS

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention pertains to control circuits for radios and, more particularly, to a control circuit that includes switches with reversible functions and a display for displaying information in inverted and non-inverted orientations.

The recent trend in the design of portable radios, such as hand-held transceivers and selective call paging receivers, has been to reduce the overall size of the radio and to add more functions and options. When more functions are added, however, additional controls must be provided to permit the user to select a particular operating parameter. But, adding controls conflicts with the trend towards smaller radios since there is less space available to add additional switches and other control devices.

To increase the number of selectable functions while reducing the number of switches, a radio controller could be designed to include a "menu" of possible function parameters that could be sequentially selected by "scrolling" through the menu by the selective activation of one of two switches. One switch would scroll "up", i.e., from the last entry in the menu towards the first, while the other switch would scroll "down", i.e., from the first entry towards the last. A display could be positioned on the top of the radio to indicate the particular parameter selected. Arrows, one facing up and one facing down, could be placed adjacent the appropriate up/down switch as indicia of scrolling direction.

Such a system would work well, provided the radio is always positioned in the same orientation during use. Such is not the case, however, with portable radios. Generally speaking, there are two preferred orientations for portable radio operation. In the first orientation, the radio is held at an angle such that the front face and the top (which includes the display) are oriented towards the user. The second preferred orientation usually results when the user attaches the radio to an article of clothing such as a belt. In the second orientation, however, the user not only views the display upside down, but the up/down indicia adjacent the switches now face in the opposite direction and the function of the switches is reversed (that is, if the up and down switches were positioned on opposite ends of the display, the switch to the right of the display may have been the up switch in the first orientation, but the switch on the right of the display in the second orientation would then be the down switch).

SUMMARY OF THE INVENTION

Briefly, the invention is a radio that includes a radio circuit with a variable parameter that can be set to one of a plurality of values. Means are provided for storing a menu of predetermined parameter values. Each of the predetermined parameter values has a corresponding displayable character set. Means are included for selecting one of the predetermined parameter values from the menu and the selecting means includes first and second switches. Means are also provided for displaying the character set corresponding to the selected one of the predetermined parameter values. These characters can be displayed in inverted and non-inverted orientations. The portable radio has a selectable non-inverted operating mode. In the non-inverted mode, the predetermined parameter values are sequentially selected from the menu in a first direction when the first switch is activated, and in a second direction when the second switch is activated. In the non-inverted mode, the character set corresponding to the selected one of the parameter values is displayed in the non-inverted orientation. The portable radio also has a selectable inverted operating mode wherein the parameter values are sequentially selected from the menu in the second direction when the first switch is activated, and in the first direction when the second switch is activated. In the inverted mode, the character set corresponding to the selected one of the parameter values is displayed in the inverted orientation. The portable radio is constructed and arranged to toggle from one of the operating modes to the other if the first and second switches are simultaneously activated for a first predetermined time.

DESCRIPTION OF THE PREFERRED EMBODIMENT

Hardware

Figure 1:
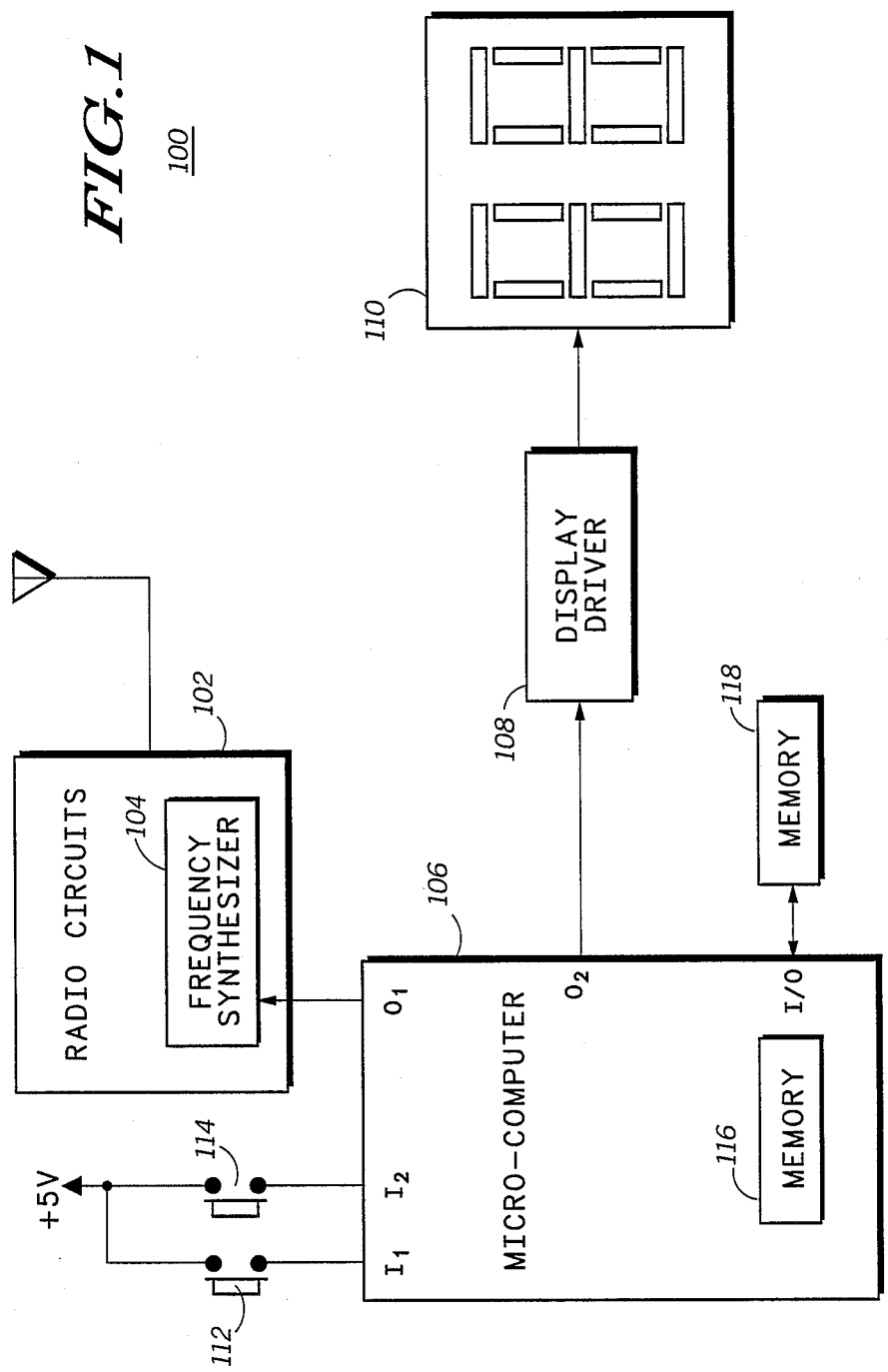
FIG. 1 is a block diagram of the present invention.
Figures 2, 3:
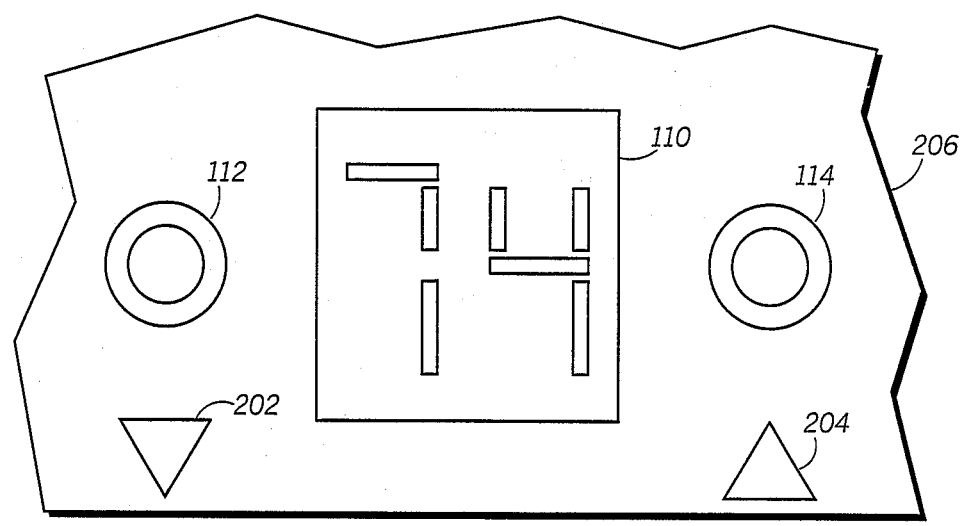
FIG. 2 is a top view of a portion of the radio of the present invention illustrating the display, the up/down switches and the indicia of scrolling direction.
FIG. 3 is a symbolic representation of that portion of the microcomputer memory that contains the menu of selectable parameter values (in the figure, the illustrated parameter is frequency) and the corresponding displayable character sets.

FIGS. 1 and 2 illustrate the preferred hardware for the present invention. Referring to FIG. 1, a radio 100 has radio circuits 102 that include a well known frequency synthesizer 102 plus other non-illustrated circuits such as audio, intermediate frequency, radio frequency and other well known radio transmitter or receiver circuits. Microcomputer 106 and display driver 108 are Motorola MC68HC05C8 and MC145000 type integrated circuits. Output $O_1$ of microcomputer 106 includes 3 lines for data, clock and enable signals which set the output frequency of synthesizer 104, and output $O_2$ includes two lines for data and clock signals which load character codes into display driver 108. Display 110 is a two digit, seven segment liquid crystal display (LCD) having four frontplane and four backplane inputs. Accordingly, the interconnection between display driver 108 and display 110 includes eight lines.

Switches 112 and 114 are single pole, single throw, momentary contact push switches. Inputs $I_1$ and $I_2$ of microcomputer 106 include non-illustrated "pull down" resistors to insure that these inputs go to ground potential when the switches are open. Microcomputer 106 includes internal random access (RAM) and read only (ROM) memory 116. And external memory 118 includes three Xicor X2404 electrically eraseable/programmable read only memory (EEPROM) integrated circuits which include a synchronous serial data and address bus. The I/O port of microcomputer 106 includes two lines for data and clock signals which are used to transfer serial address information to memory 118, and to transfer serial data information to and from the memory.

Other well known microcomputer or microprocessors 106, display drivers 108, displays 110, and switches 112 and 114, besides those specified above, may also be suitable. In particular, the present invention may be used to control other radio circuits 102, besides frequency synthesizer 104. Thus, any radio circuit that has a variable parameter that can be set to one of a plurality of values, can be controlled by the present invention.

In FIG. 2, that portion of the top of radio 100 that contains display 110 and switches 112 and 114 is illustrated. Referring to this figure, switch 112 is mounted to the left of display 110, while switch 114 is positioned to the right. Below switch 112 is an arrow or indicia 202 which points downward. Similarly, arrow or indicia 204 is positioned below switch 114, but points upward. Other configurations are also possible, for example, switches 112 and 114 could both be positioned to one side of display 110, with one switch positioned above the other.

The particular orientation of the radio illustrated in FIG. 2 will be referred to as the non-inverted radio orientation. This is the orientation wherein the front 206 of the radio (only the edge of front 206 is visible in FIG. 2) is facing towards the user. If the radio is rotated such that front 206 faces away from the user, i.e., if FIG. 2 is held upside down, the inverted radio orientation results. The inverted radio orientation typically results when the radio is attached to the user's belt or other article of clothing. In the inverted radio orientation, each indicia adjacent switches 112 and 114 now points in the opposite direction; specifically, indicia 204 points downward and indicia 202 points upward. Also, the position of the switches 112 and 114 is reversed from left to right; specifically, switches 112 and 114 are now positioned respectively to the right and left of display 110. Furthermore, a character that appears upright when the radio is held in the non-inverted orientation, would appear inverted in the inverted radio orientation.

The Menu

A "menu" of frequencies and corresponding displayable character sets (more specifically, codes that represent these frequencies and characters) is programmed in external memory 118. The microcomputer selects one of the "entries" in the menu, loads the selected entry's frequency code into synthesizer 104, and then displays the corresponding character set in display 110.

FIG. 3 is a symbolic representation of the menu of frequencies and corresponding displayable character sets. Physically, the menu is a block of sequential memory bytes which has been organized into as many as 99 "entries"; each entry comprising a plurality of sequential bytes. In FIG. 3, each one of these entries has been labeled with a menu entry number which appears in the first column of the menu. Stored in each entry is the code for a particular frequency and the code for the corresponding displayable character for that frequency; the first byte or bytes in each entry containing the frequency code and the remaining byte or bytes the character set code. These frequencies and corresponding displayable character sets appear respectively in the second and third columns of FIG. 3. As will be explained in greater detail below, the microcomputer "scrolls" either "up" or "down" through the menu to select a particular entry, the up and down directions being indicated by the two vertical arrows in FIG. 3.

As indicated above, the present invention can be used to control other circuits in the radio besides frequency synthesizer 104. In this event, other parameter values, besides frequency codes, would be stored in each entry of the menu. For example, the present invention could be used to select one of a plurality of receiver squelch codes, selective call paging codes, information scrambling codes, or other radio options.

Radio Operation

To select a particular operating frequency (or other parameter value) from the menu, the radio operator can scroll the microcomputer up and down the menu, stopping at the desired entry. At each entry, the microcomputer loads the corresponding frequency code into synthesizer 104, and displays the character set corresponding to the particular entry selected. In FIG. 2, the microcomputer has presently selected the fifth entry of the menu and, therefore, the character set "74" appears in display 110. This indicates to the operator, for example, that he or she is transmitting or receiving on channel "74".

Scrolling is initiated by activating either switch 112 or 114. Activating one of the switches causes scrolling in one direction, while activating the other switch causes scrolling in the opposite direction. The scrolling direction of a particular switch, however, is not fixed, but depends on the particular display/switch mode the microcomputer is presently operating in.

The subroutine described below can place the microcomputer in either an inverted or non-inverted display/switch mode. The particular mode selected determines the orientation of the characters in display 110 and the scrolling direction of each switch. In the non-inverted display/switch mode, the displayable characters appear upright when the radio is positioned in the non-inverted orientation. (Recall that the radio has two preferred operating positions or orientations: specifically, inverted and non-inverted orientations) Also, in the noninverted display/switch mode, activation of switch 114 (which is positioned to the right of display 110 when the radio is in the non-inverted orientation) causes the microcomputer to scroll up through the menu and activation of switch 112 causes the microcomputer to scroll down.

By contrast, when the microcomputer is in the inverted display/switch mode, the displayable characters appear upright when the radio is positioned in the inverted orientation. Also, in the inverted display/switch mode, activation of switch 112 (which is positioned to the right of display 110 when the radio is in the inverted orientation) causes the microcomputer to scroll up through the menu and activation of switch 114 causes the microcomputer to scroll down. Thus, when the display/switch mode is changed, the characters appearing in the display are "flipped", and the scrolling direction of switches 112 and 114 is reversed.

When the radio is held in the non-inverted orientation and the microcomputer is in the non-inverted display/switch mode, sequential activation of switch 114 causes the microcomputer to scroll up through the menu. Thus, beginning at the fifth entry (see FIG. 3), one activation of switch 114 will cause the microcomputer to scroll up to the fourth entry, wherein a different code will be loaded into frequency synthesizer 104 and the character set "51" will appear in display 110. An additional activation of switch 114 will cause the microcomputer to scroll up again to the third entry, wherein another code is loaded into frequency synthesizer 104 and the character set "23" appears in display 110. Similarly, activating switch 112 in this mode causes the microcomputer to scroll down through the menu. Thus, if the microcomputer has presently selected the third entry and switch 112 is activated once, the microcomputer will scroll down to the fourth entry wherein the character set "51" will be displayed. A second activation of switch 112 will cause the microcomputer to scroll down to the fifth entry and return the display to the position illustrated in FIG. 2.

If the operator repositions the radio in the inverted orientation such that front 206 now faces away from the operator (invert FIG. 2), indicia 204 now points down instead of up and indicia 202 points up instead of down. However, switch 114, which is adjacent to indicia 204 (which points down), presently causes the microcomputer to scroll up; while switch 112, which is adjacent to indicia 202 (which points up), presently causes the microcomputer to scroll down. Thus, in this orientation of the radio, the function of the switches presently does not correspond with the indicia. Furthermore, the switch to the right of the display in the non-inverted orientation caused the microcomputer to scroll up, but when the radio is repositioned in the inverted orientation, the switch to the right of the display presently causes the microcomputer to scroll down. Thus, the function of the switches is presently reversed from left to right.

To correct this problem, the operator depresses both switches 112 and 114 and holds them down simultaneously for approximately 850 milliseconds. This causes two things to happen. First, the character set presently appearing in display 110 will be "flipped" or inverted so that the character set will appear upright to the user. Second, the scrolling direction of switches 112 and 114 will be reversed. In other words, switch 114 now causes the microcomputer to scroll down through the menu, and switch 112 causes the microcomputer to scroll up. This corrects the two problems cited above; specifically, the scrolling direction of the switches now corresponds to the indicia, and the function of the "left" and "right" switches is preserved.

If the radio is then repositioned to the non-inverted orientation, the operator simply redepresses both switches simultaneously for another 850 milliseconds and the microcomputer will toggle back to the non-inverted display/switch mode.

To prevent repeated toggling of the microcomputer from one display/switch mode to the other in the event the operator holds both switches depressed for a period of time in excess of 850 milliseconds, at least one of the switches 112 and 114 must be deactivated before a second toggling of the display/switch mode can occur. Thus, if switches 112 and 114 are simultaneously activated and maintained activated for an extended period of time, well in excess of the 850 milliseconds required to toggle the display/switch mode, only one "flip" or "toggle" of the mode results.

An accelerating scroll function is also provided wherein the continuous activation of one switch causes the display to scroll automatically from one entry in the menu to the next, with the time between the selection of adjacent entries decreasing the longer the switch is activated. For example, if menu entry five is presently selected and the appropriate switch is depressed to cause the microcomputer to scroll up through the menu, the fourth entry in the menu will be selected next. Continuing to hold the same switch down, the microcomputer will scroll automatically to the third entry after a first predetermined period of time has elapsed. Again, continuing to hold the same switch down, the microcomputer will scroll from the third to the second entry after a second, but shorter, predetermined period of time has elapsed. Of course, releasing the switch and reactivating the switch will reinitialize the time between the selection of successive entries in the menu to its original value.

Software

The software that controls the selection of the menu entries is embodied in a subroutine which preferably resides in internal memory 116. It is necessary for the main program to call this subroutine on a periodic basis, approximately every 1 millisecond. The main program typically controls other radio functions that are unrelated to the present invention and, therefore, the main program is neither described nor illustrated herein.

Table 1, which appears at the end of the "Description of the Preferred Embodiment", is a computer program list of the preferred object code for the subroutine. This object code has been assembled for a Motorola MC68HC05C8 microcomputer. In Table 1, each pair of hexadecimal characters represents one byte of code and, within each line, successive bytes are listed from left to right, the first byte appearing in the upper left-hand corner of the table.

Figure 4A:
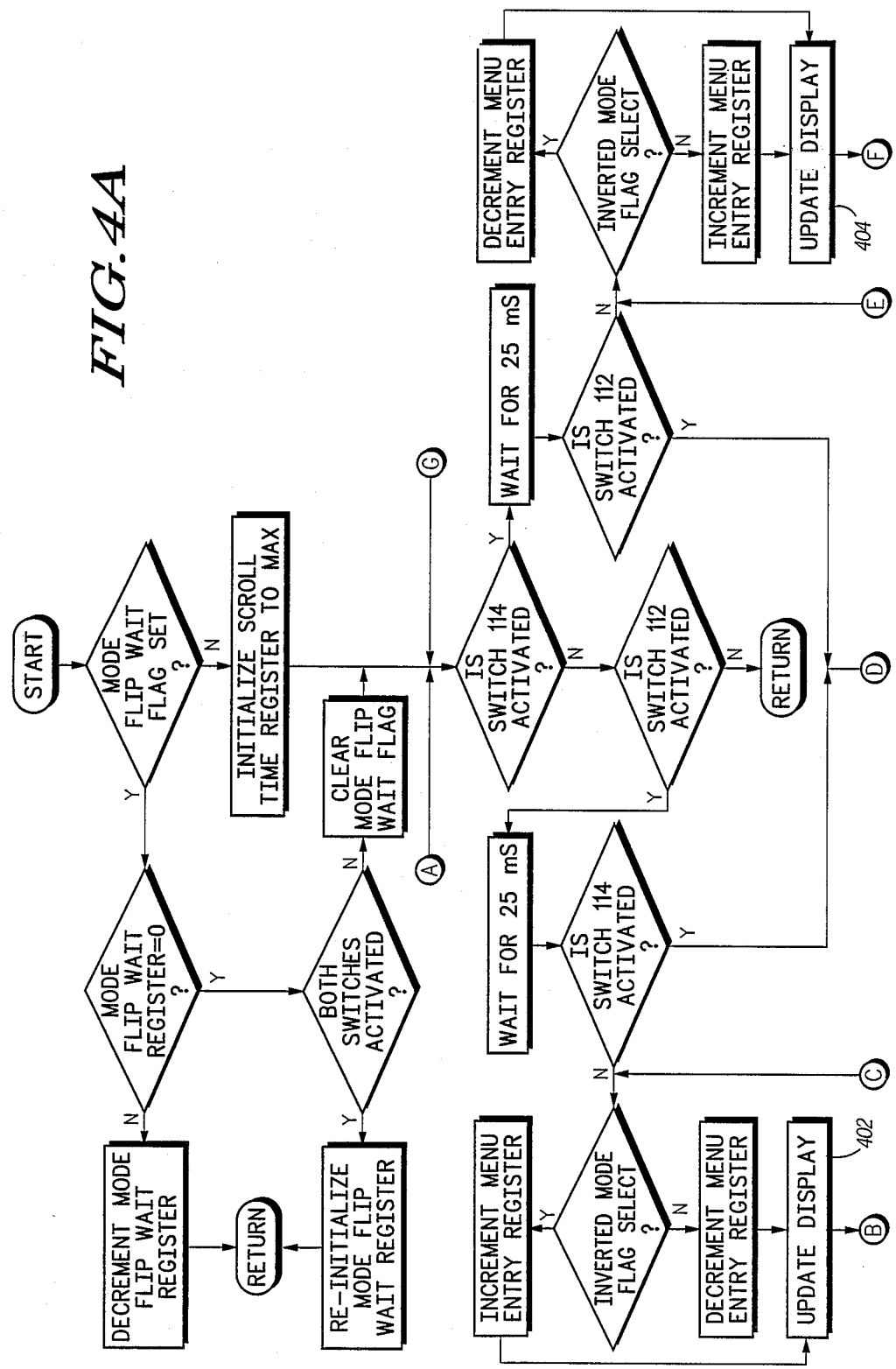
FIGS. 4a and 4b form a flow chart of the software subroutine embodied in the microcomputer of FIG. 1. Points referenced by circled characters in FIG. 4a connect to identically referenced points in FIG. 4b and, collectively, both figures are referred to simply as "FIG. 4".
Figure 4B:
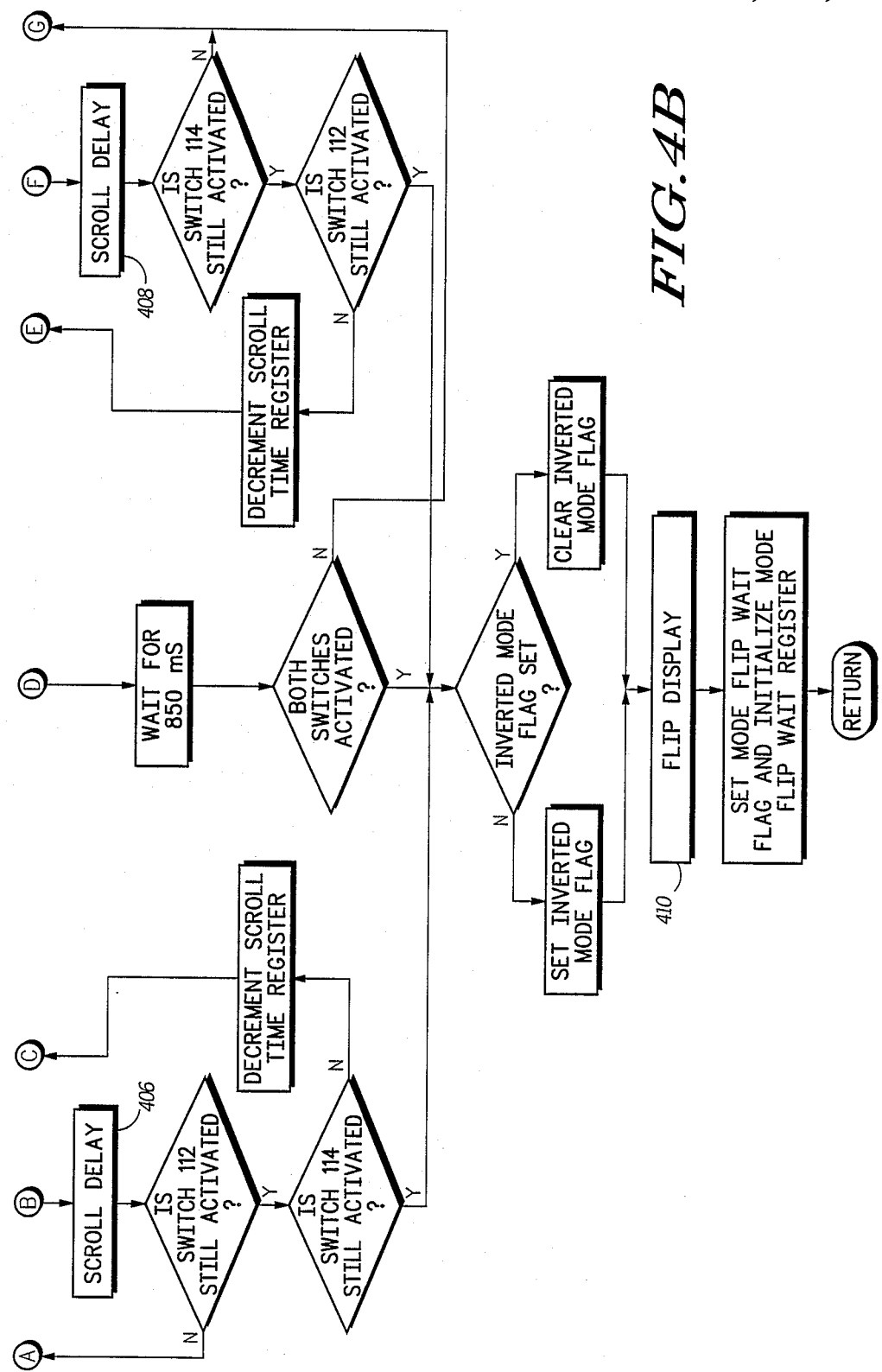

In FIG. 4, a flow chart of the subroutine is illustrated. Referring to this figure, the subroutine uses a plurality of registers and flags. An "inverted mode flag" is set to indicate that the inverted display/switch mode has been selected. A "mode flip wait flag" is set when the display/switch mode toggles from one mode to the other, and a "mode flip wait register" is used to establish a minimum waiting period after the mode toggles. During this waiting period, the subroutine is non-responsive to the activation of the switches. To implement the accelerating scroll feature, a "scroll time register", which can be periodically decremented if one of the switches is continuously activated, sets the time interval between the selection of sequential entries in the menu. And a "menu entry register" points to the currently selected menu entry.

In steps 402 and 404, the display is updated by loading the character set from the particular entry in the menu currently selected by the menu entry register, into display driver 108. In steps 406 and 408, a delay is executed for a period of time that depends on the number currently stored in the scroll time register, the larger the number, the longer the delay.

To display a character, the microcomputer selects the seven segment code for that character from one of two tables which are stored in memory. The first table contains the seven segment code for each character to be displayed in the non-inverted orientation, while the second table contains the codes for the inverted orientation. Thus, in step 410, the display is flipped merely by switching from one table to the other.

TABLE 1

066A0BA6FBB75000001E02004081CC1D681D12B618AB2DB716B619BE13B7
171F82CDOAF30D13FD811F01ADE5020005CD1DA920061B121A6920360100
66ADD2010061006A52026A4F03004C20231F01ADC0000005CD1D8B20061B
121A692011030041ADAD03003C006A2D026A2A010027A6FAB770CD1DE401
001D03001A0F6C160C69041C6920021D69B654CD1DF4166AA6FDB7701A12
81B650A1FF27034CB750CC1CC8CD1CD281CD07F7B670261B1B12176AB600
A403A1002709A6FEB770166A1A1281CD07F7CC1CC1810A690C016A09B6CB
B7540FD10214D01B120C691EB6544A4A2A1FB679201B0A690C016A09B6CB
B7540FD10214D01B120C69E2B654B17923014F4CB754CD1DF41A69B650B7
701A12CD07F7B600A403A1002704B67026F11B12811A12CD07F7B67026F9
B613B6191B1281

© Motorola 1987

I claim:

1. A portable radio, comprising in combination:
a radio circuit having a variable parameter, wherein said variable parameter can be set to one of a plurality of values;
means for storing a menu of predetermined parameter values, each of said predetermined parameter values having a corresponding displayable character set;
means for selecting one of said predetermined parameter values from said menu, said selecting means including first and second switches;
means for displaying the character set corresponding to the selected one of said predetermined parameter values in one of inverted and non-inverted orientations;
said portable radio having a selectable non-inverted operating mode wherein said predetermined parameter values are sequentially selected from said menu in a first direction when said first switch is activated and in a second direction when said second switch is activated, and the character set corresponding to the selected one of said parameter values is displayed in said non-inverted orientation;
said portable radio also having a selectable inverted operating mode wherein said parameter values are sequentially selected from said menu in said second direction when said first switch is activated and in said first direction when said second switch is activated, and the character set corresponding to the selected one of said parameter values is displayed in said inerted orientation;
said portable radio being constructed and arranged to toggle from one of said operating modes to the other if said first and second switches are simultaneously activated for a first predetermined period of time.

2. The radio of claim 1, further constructed and arranged such that one of said first and second switches must be deactivated after said radio toggles from a first one of said operating modes to a second one of said operating modes, before said radio can be toggled back to said first one of said operating modes.

3. The portable radio of claim 1, further constructed and arranged such that, continuously activating one of said first and second switches for a second predetermined time, causes a multiplicity of parameter values to be sequentially selected, wherein the time between each selected parameter decreases as the activation time of the continuously activated switch increases.

* * * * *